(12) United States Patent
Grüner et al.

(10) Patent No.: US 8,735,461 B2
(45) Date of Patent: May 27, 2014

(54) PRINTING INK, IN PARTICULAR INK-JET INK, CONTAINING PEARLESCENT PIGMENTS BASED ON FINE AND THIN SUBSTRATES

(75) Inventors: Michael Grüner, Auerbach (DE); Günter Kaupp, Neuhaus (DE); Stefan Engel, Rückersdorf (DE); Barbara Mendler, Meersburg (DE); Ulrich Schmidt, Hersbruck (DE)

(73) Assignee: Eckart GmbH (DE)

( * ) Notice: Subject to any disclaimer, the term of this patent is extended or adjusted under 35 U.S.C. 154(b) by 0 days.

(21) Appl. No.: 13/381,404

(22) PCT Filed: Jun. 22, 2010

(86) PCT No.: PCT/EP2010/003740
§ 371 (c)(1),
(2), (4) Date: Jan. 24, 2012

(87) PCT Pub. No.: WO2011/000491
PCT Pub. Date: Jan. 6, 2011

(65) Prior Publication Data
US 2012/0125229 A1 May 24, 2012

(30) Foreign Application Priority Data
Jun. 30, 2009 (DE) .......................... 10 2009 031 266

(51) Int. Cl.
*C08F 2/46* (2006.01)
*C08G 61/04* (2006.01)

(52) U.S. Cl.
USPC .................................................. 522/1; 520/1

(58) Field of Classification Search
USPC .................................................. 522/1; 520/1
See application file for complete search history.

(56) References Cited

U.S. PATENT DOCUMENTS

| | | | |
|---|---|---|---|
| 6,019,831 A | 2/2000 | Schmidt et al. | |
| 6,294,592 B1 | 9/2001 | Herrmann et al. | |
| 6,689,205 B1 | 2/2004 | Brückner et al. | |
| 7,413,599 B2 | 8/2008 | Henglein et al. | |
| 7,699,927 B2 | 4/2010 | Henglein et al. | |
| 2005/0013934 A1 | 1/2005 | Xiong et al. | |
| 2005/0176850 A1* | 8/2005 | Schmidt et al. | 523/160 |
| 2006/0042509 A1 | 3/2006 | Henglein et al. | |
| 2006/0111466 A1* | 5/2006 | Bujard et al. | 523/160 |
| 2006/0223910 A1 | 10/2006 | Bagala, Sr. | |
| 2007/0199478 A1 | 8/2007 | Schlegl et al. | |
| 2008/0017076 A1 | 1/2008 | Noguchi | |
| 2008/0181921 A1* | 7/2008 | DeLuca | 424/401 |
| 2009/0258251 A1 | 10/2009 | Abe et al. | |
| 2009/0311209 A1 | 12/2009 | Bujard | |
| 2010/0298469 A1 | 11/2010 | Kaupp et al. | |
| 2011/0226161 A1 | 9/2011 | Schumacher et al. | |
| 2011/0259243 A1 | 10/2011 | Schumacher et al. | |
| 2011/0265689 A1 | 11/2011 | Schumacher et al. | |
| 2011/0265690 A1 | 11/2011 | Schumacher et al. | |

FOREIGN PATENT DOCUMENTS

| | | |
|---|---|---|
| DE | 19618569 A1 | 11/1997 |
| DE | 197 27 767 A1 | 1/1999 |
| DE | 19727767 A1 | 1/1999 |
| DE | 10315775 A1 | 10/2004 |
| DE | 10 2004 041 592 A1 | 3/2006 |
| DE | 102004041592 A1 | 3/2006 |
| DE | 603 18 235 T2 | 12/2008 |
| DE | 10 2007 041 027 A1 | 3/2009 |
| EP | 1 554 345 B1 | 7/2005 |
| EP | 1 682 622 A1 | 7/2006 |
| EP | 1 727 864 A1 | 12/2006 |
| EP | 1727864 A1 | 12/2006 |
| EP | 1554345 B1 | 12/2007 |
| JP | 09-255891 | 9/1997 |
| JP | 2000-281932 | 10/2000 |
| JP | 2002-294098 | 10/2002 |
| JP | 2003080836 | 3/2003 |
| JP | 2003080836 A | 3/2003 |
| JP | 2006-124524 | 5/2006 |
| JP | 2006-527779 | 12/2006 |
| JP | 2007-126643 | 5/2007 |
| JP | 2008-510866 | 4/2008 |
| JP | 2008-546880 | 12/2008 |
| WO | WO 2004/087816 | 10/2004 |
| WO | WO 2006/021388 A1 | 3/2006 |
| WO | WO 2009/010288 A2 | 1/2009 |
| WO | WO 2009/030293 A2 | 3/2009 |

OTHER PUBLICATIONS

Franz Hofmeister, et al., "Reflectance Measurements of Interference, Aluminum, and Masstone Pigments," Farbe + Lack, 95, pp. 557-560 (1989).
C. Schmidt, et al. "Optical Physics of Synthetic Interference Pigments," Kontakte (Darmstadt), 1992 (2) S. pp. 15-24.
German Examination Report dated Mar. 3, 2010 in corresponding German Patent Application No. 10 2009 031 266.8-43.
International Search Report dated Dec. 12, 2010, issued in corresponding international application No. PCT/EP2010/003740.
Notice of Reasons for Rejection dated Jan. 29, 2013 in corresponding Japanese Patent Application No. 2011-504373 (with English language translation).

* cited by examiner

*Primary Examiner* — Ling Choi
*Assistant Examiner* — Jessica E Whiteley
(74) *Attorney, Agent, or Firm* — Ostrolenk Faber LLP

(57) ABSTRACT

A printing ink, preferably ink-jet ink, containing pearlescent pigments and at least one of at least one solvent, at least one radiation-curable component and at least one binder, wherein the pearlescent pigments comprise a substantially transparent platelet-shaped substrate having a density $\rho_S$ and at least one optically active coating having a density $\rho_M$, and the pearlescent pigments have a $d_{90}$ value for a cumulative frequency distribution of a volume-averaged size distribution function with a range from 3.5 to 15 μm. The invention further relates to a process for producing the printing ink.

12 Claims, 1 Drawing Sheet

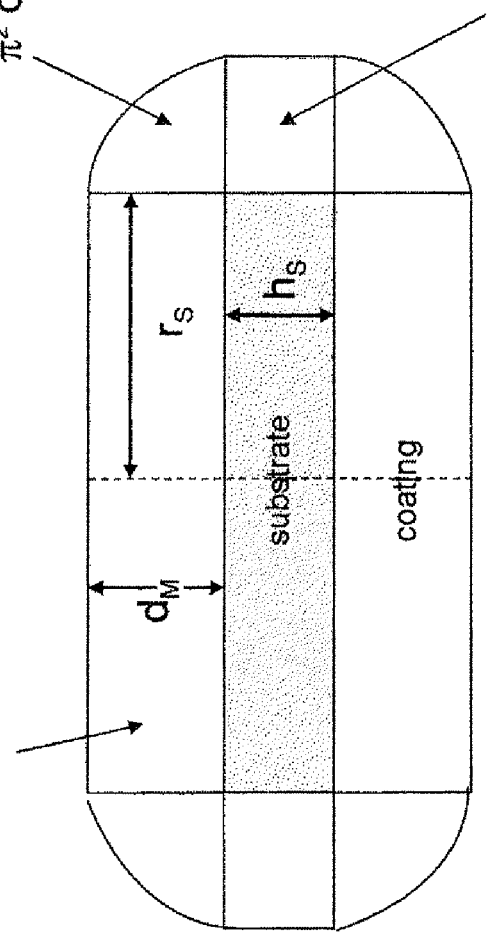

PRINTING INK, IN PARTICULAR INK-JET INK, CONTAINING PEARLESCENT PIGMENTS BASED ON FINE AND THIN SUBSTRATES

CROSS-REFERENCE TO RELATED APPLICATIONS

The present application is a 35 U.S.C. §371 National Phase conversion of PCT/EP2010/003740, filed Jun. 22, 2010, which claims the benefit of German Application No. 10 2009 031 266.8, filed Jun. 30, 2009, the disclosures of which are incorporated herein by reference. The PCT International Application was published in the German language.

TECHNICAL FIELD

The invention relates to prinking ink, in particular ink-jet ink, containing pearlescent pigments based on fine and thin substrates. The invention further relates to the production of such printing ink, in particular ink-jet ink, as well as to the use of pearlescent pigments based on fine and thin substrates in printing ink, in particular ink-jet ink.

BACKGROUND

In the ink-jet printing process, tiny droplets of ink-jet ink are applied directly to the substrate to be printed, without physical contact between the printer and the latter. Placing the individual droplets on the substrate to be printed is done under electronic control. Ink-jet printing is an important technology for printing on the one hand various substrates such as for example paper, card, film, foil, etc. or on the other products such as for example bottles, cans, etc. with diverse data or images. Ink-jet prints can even be provided to fragile objects, for example eggs. Ink-jet technology is capable of providing high definition prints.

Various droplet formation processes have been developed in the past. Droplet formation can be effected for example electrostatically, magnetically, piezoelectrically, electrothermally, via mechanical microvalves or by spark discharge. Irrespective of the manner of droplet formation, ink-jet technology divides in principle into two categories, into continuous ink-jet (CIJ) and impulse or drop-on-demand (DOD) technology.

In continuous ink-jet, ink flows under pressure through a nozzle to form droplets which are applied to a substrate in a continuous jet.

In impulse ink-jet, by contrast, the ink reservoir is kept at or below atmospheric pressure. A droplet of ink is only released from a nozzle in response to the droplet-forming unit being subjected to controlled stimulating impulse. This technology is mainly used in color printers.

After the droplets of ink-jet ink have been applied to the substrate to be printed, the ink-jet ink is dried or cured. This can be effected for example through agency of heat or UV light. This process ensues immediately upon application of the ink on the substrate to be printed. Drying or curing takes between fractions of a second and minutes depending on the drying or curing process.

Color printers have recently been developed to produce colored prints in the primaries yellow, cyan, magenta and black. These colors are widely used as process colors in established printing processes such as lithography, gravure printing or flexographic printing.

To further enhance the quality of colored prints, particularly in view of increasing uses of promotional prints, spot colors are used. These spot colors consist of a straight or a mixed ink and are printed in a single pass. These spot colors, in addition to the four primary colors, may be inter alia the colors orange, green or any further color to increase the color scale and the vitality of the printed image.

If the colored print is to be endowed with a metallic effect, metallic effect pigments can be added to the ink. To obtain a gold- or silver-colored print, gold- or silver-colored metallic effect pigments are used in the ink-jet ink. Useful gold-colored metallic effect pigments include for example brass pigments obtained from a copper-zinc alloy and known as golden bronzes. In brass pigments, the hue of the alloy is determined by the copper/zinc ratio. Golden bronze pigments are commercially traded in characteristic natural hues as "pale gold" having a copper fraction of about 90% by weight, remainder zinc, as "rich pale gold" having a copper fraction of about 85% by weight, remainder zinc, and as "rich gold" having a copper fraction of about 70%, remainder zinc. Alternatively, golden-colored prints are also obtainable by mixing silver-colored metallic effect pigments with yellow and optionally red colorants.

Platelet-shaped aluminum pigments for example are useful as silver-colored metallic effect pigments. WO 2009/010288 A2 discloses ink-jet inks containing thin aluminum pigments. Ink-jet inks containing metallic effect pigments are commercially available under the trade name of Jetfluid (from Eckart GmbH).

If it is not a purely golden- or silver-colored ink-jet print that is desired, but a metallically seeming printed image of a certain color, the ink-jet ink may have added to it, in addition to the metallic effect pigments, further colorants in the desired color to be achieved. Alternatively, the ink-jet inks containing metallic effect pigments can be printed together with further ink-jet inks present in the printing system (process inks) and thus be mixed therewith on the substrate to be printed. Depending on the desired effect to be achieved, it is initially also possible to print an ink-jet ink containing metallic effect pigments and subsequently to overprint it with a process ink.

EP 1 554 345 B1 describes aqueous ink compositions for the ink-jet printing process which provide prints having an appearance which is metallic or dependent on the viewing angle. The pigments in the ink composition comprise a core consisting of a transparent or metallically reflective material, and at least one coating consisting of one or more silicon oxides ($SiO_x$ layer). The average particle diameter is at least 2 µm.

DE 19727767 A concerns radiation-curable ink-jet inks containing at least one finely granular organic or inorganic pigment. Interference pigments are mentioned as examples of inorganic pigments. It is preferable for 95% and more preferable for 99% of the pigments to have a particle size <1 µm.

A common method of achieving a pearl luster effect in a printed image is to print on a substrate already precoated with pearlescent pigments, as described in JP 2003080836A, for example. However, in using such a substrate to be printed, it is disadvantageously not possible to provide the substrate with the pearl luster effect in selected areas only.

SUMMARY

The problem addressed by the present invention is that of providing printing ink, in particular ink-jet ink, containing pearlescent pigments which endows the substrate to be printed with that the wet-look luster typical of pearlescent pigments while at the same time the substrate is translucent. Resolution of the printed image shall be at least 300 dpi.

Furthermore, the printhead shall not be clogged by the pearlescent pigments in the printing ink, in particular ink-jet ink.

The problem addressed by the invention is solved by providing a printing ink, in particular an ink-jet ink, containing pearlescent pigments and at least one solvent and/or at least one radiation-curable component and/or at least one binder, wherein the pearlescent pigments comprise a substantially transparent platelet-shaped substrate having a density $\rho_S$ and at least one optically active coating having a density $\rho_M$, and the pearlescent pigments have a $d_{90}$ value for the cumulative frequency distribution of the volume-averaged size distribution function from a range from 3.5 to 15 μm.

The problem addressed by the invention is also solved by a process for producing the printing ink, in particular ink-jet ink, according to the invention, the process comprising the steps of:

(a1) classifying substantially transparent platelet-shaped substrates, (b1) coating the classified substrate obtained in step (a1) with at least one optically active, preferably high-refractive, layer to obtain a pearlescent pigment having a $d_{90}$ value for the cumulative frequency distribution of the volume-averaged size distribution function from a range from 3.5 to 15 μm, or (a2) coating substantially transparent platelet-shaped substrates with at least one optically active, preferably high-refractive, layer, (b2) classifying the pearlescent pigment obtained in step (a2) to obtain a pearlescent pigment having a $d_{90}$ value for the cumulative frequency distribution of the volume-averaged size distribution function from a range from 3.5 to 15 μm, and then (c) mixing the resulting pearlescent pigments with at least one solvent and/or at least one radiation-curable component and/or at least one binder to obtain the printing ink, preferably ink-jet ink.

In relation to the process for producing the printing ink, preferably ink-jet ink, according to the invention, the process with the process steps in the order (a1)+(b1)+(c) is preferred.

The problem addressed by the invention is also solved by the use of pearlescent pigments including a substantially transparent platelet-shaped substrate having a density $\rho_S$ and at least one optically active coating having a density $\rho_M$, with a $d_{90}$ value for the cumulative frequency distribution of the volume-averaged size distribution function from a range from 3.5 to 15 μm, in printing ink, preferably ink-jet ink.

DETAILED DESCRIPTION

It is an utterly surprising finding that pearlescent pigments can be used in printing inks, especially in ink-jet inks. Pearlescent pigments, unlike the flexible metallic effect pigments, are brittle and tend to break on being subjected to a mechanical load. Especially in view of the forces acting on platelet-shaped pigments during an ink-jet printing operation the expectation was that pearlescent pigments would partly or wholly break and hence cause the optical quality of the printed image then obtained to be impaired. The pearlescent pigments to be used according to the invention are small in pigment diameter and low in pigment thickness. Irrespective of the low pigment thickness, however, the pearlescent pigments according to the invention do not break, surprisingly.

It is a further surprise that there is also no marked spalling, preferably no spalling at all, of the optically active coating(s). Hence the pearlescent pigments to be used according to the invention are efficiently minglable with the further components or incorporable in printing inks, preferably ink-jet inks, for example under stirring and/or under agency of ultrasound.

It is a final surprise that any sedimented and/or agglomerated pearlescent pigments are readily redispersible.

It is preferably substrates composed of natural mica, talc, sericite, kaolin, synthetic mica, glass platelets (also known as glass flakes), $SiO_2$ platelets, $Al_2O_3$ platelets, graphite platelets, plastics platelets, platelet-shaped substrates comprising a mixed organic-inorganic layer, for example known from WO 2009030293 A2, or mixtures thereof which are used or known as substantially transparent platelet-shaped substrates for the pearlescent pigments used in the printing ink, preferably ink-jet ink, according to the invention. Particular preference is given to natural mica, synthetic mica, $SiO_2$ platelets, glass platelets and/or $Al_2O_3$ platelets. Natural mica and/or synthetic mica are extremely preferable.

It is similarly possible to use uncoated platelet-shaped BiOCl in the printing ink, preferably ink-jet ink, according to the invention.

When the pearlescent pigments used in the printing ink, preferably ink-jet ink, according to the invention are based on glass platelets, it is preferable for the pearlescent pigments to have an average height >1 μm.

The pearlescent pigments used in the printing ink, preferably ink-jet ink, according to the invention include at least one optically active coating, preferably in the form of a high-refractive coating, more preferably high-refractive metal oxide layer, and/or a semitransparent metal coating having a density $\rho_M$. The $\rho_M$ density is the density of the optically active coating. Thus, in the case of a metal oxide layer $\rho_M$ is the density of the metal oxide layer and in the case of a semitransparent metal layer $\rho_M$ is the density of the semitransparent metal layer.

The terms "coating" and "layer" are used interchangeably in the present invention.

An optically active coating of pearlescent pigments is herein to be understood as meaning for example semitransparent layers of metal. The thickness of semitransparent layers of metal is typically in a range from 5 to 30 nm and preferably from 10 to 25 nm. Layer thicknesses from a range from 12 to 20 nm will also prove very suitable.

An optically active coating of pearlescent pigments is further to be understood as preferably meaning one metal oxide layer or two or more, for example 2, 3, 4, etc., preferably high-refractive, metal oxide layers. The refractive index $n_M$ of high-refractive metal oxide layers is preferably above 1.8 and further preferably above 2.0. Refractive indices of more than 2.2 or more than 2.6 will also prove very suitable. The thickness of the high-refractive layer of metal oxide is preferably in a range between 10 and 300 nm, more preferably between 20 and 200 nm and even more preferably between 25 and 150 nm. Instead of high-refractive metal oxides, other high-refractive materials can also be used, examples being metal sulfides, metal selenides or metal nitrides, in which case the layer thicknesses preferably have the ranges recited for high-refractive metal oxides.

In one preferable embodiment, the pearlescent pigments include at least one high-refractive coating. The high-refractive coating preferably has a refractive index $n_M > 2.0$ and more preferably a refractive index $n_M > 2.2$.

In one much preferred embodiment of the invention, the optically active coating of pearlescent pigments is one high-refractive metal oxide layer.

It is particularly preferable for the high-refractive coating to be or include a metal oxide layer and/or a metal hydroxide layer and/or a metal oxide hydrate layer.

The high-refractive layers used are preferably high-refractive metal oxides, metal hydroxides and/or metal oxide hydrates. The metal oxides used are preferably metal oxides from the group consisting of titanium oxide, iron oxide, cerium oxide, chromium oxide, tin oxide, zirconium oxide, cobalt oxide and mixtures thereof. Instead of or in addition to the aforementioned oxides, as would be appreciated, the corresponding metal hydroxides and/or metal oxide hydrates can also be used.

The titanium oxide can be selected from the group consisting of rutile, anatase and pseudobrookite. Preferably, the titanium oxide is in the form of $TiO_2$ in the rutile polymorph.

The iron oxide is preferably selected from the group consisting of hematite, goethite and/or magnetite. The iron oxide is preferably in the form of $Fe_2O_3$ (hematite) and/or $Fe_3O_4$ (magnetite).

Particular preference is given to $TiO_2$ and $Fe_2O_3$ and also mixtures and combinations thereof. In mixtures of these oxides, the $TiO_2$ is in a brookite polymorph or alternatively in the form of ilmenite.

Instead of or in addition to the one or more high-refractive metal oxide layers, one or more semitransparent layers of metal may also be applied as optically active coating or layer. To produce the semitransparent layers of metal, it is preferable to apply one or more metals selected from the group consisting of silver, gold, aluminum, iron, magnesium, chromium, copper, zinc, tin, manganese, cobalt, titanium, molybdenum and mixtures and also alloys thereof.

For the purposes of this invention, pigments based on substantially transparent substrates and a semitransparent layer of metal are also referred to as pearlescent pigments. The pearlescent pigments according to the invention preferably have an interference effect.

It will be appreciated that it is also possible for more than one high-refractive metal oxide layer to have been applied to the substrate of pearlescent pigments. In this version, two high-refractive metal oxide layers are preferably interposed with at least one low-refractive layer, which preferably has a refractive index less than 2.0, preferably less than 1.8 and more preferably less than 1.6.

The low-refractive layers in pearlescent pigments preferably utilize low-refractive metal oxide layers especially of silicon oxide/hydroxide, preferably $SiO_2$, aluminum oxide, preferably $Al_2O_3$, AlOOH, boron oxide, $MgF_2$ or mixtures thereof. It is particularly preferable to use silicon oxide and/or aluminum oxide.

It will be appreciated that it is also possible for two or more high- and low-refractive metal oxide layers to have been arranged in alternating fashion in succession on the substantially transparent substrate.

In a preferable further development of the invention, the pearlescent pigments in the printing ink, preferably ink-jet ink, in addition to the optically active, preferably high-refractive layer, have at least one further, protective layer disposed thereon.

The at least one further, protective layer may be at least one metal oxide layer whose metal oxides are selected from the group consisting of $SiO_2$, $Al_2O_3$, cerium oxide and mixtures and combinations thereof. A polymeric coating, for example a polyacrylate layer, may also be applied as protective layer.

Particular preference here is given to protective layers composed of $SiO_2$ or of cerium oxide combined with $SiO_2$, as described in EP 1727864 A1 and EP 1682622 A1, which are hereby incorporated herein by reference.

The $d_{90}$ value for the cumulative frequency distribution of the volume-averaged size distribution function obtained by laser diffraction methods indicates that 90% of the pearlescent pigments have a diameter which is equal to or less than the particular value indicated. The size distribution curve is preferably determined using a Cilas 1064 instrument from Cilas. The same holds mutatis mutandis for the particular $d_{50}$, $d_{90}$, $d_{95}$ and $d_{98}$ values reported.

The $d_{90}$ value is a measure of the coarse fraction. The smaller this value, the better the usability of the invention's pearlescent pigment-containing printing inks, in particular ink-jet inks, in different ink-jet printheads. According to the invention, the pearlescent pigments have a size distribution with a $d_{90}$ value from a range from 3.5 to 15 µm. The $d_{90}$ value for the size distribution of the pearlescent pigments is preferably from a range from 4 to 13 µm, more preferably from a range from 5.5 to 12 µm, even more preferably from a range from 5 to 10 µm and yet even more preferably from a range from 5.1 to 8 µm.

In a further embodiment of the invention, the pearlescent pigments have a size distribution with a $d_{95}$ value from a range from 5 to 20 µm, preferably from a range from 5.5 to 15 µm, more preferably from a range from 6 to 13 µm and even more preferably from a range from 6.5 to 10 µm.

In a further embodiment of the invention, the pearlescent pigments have a size distribution with a $d_{98}$ value from a range from 6 to 25 µm, preferably from a range from 6.5 to 20 µm, more preferably from a range from 7 to 15 µm and even more preferably from a range from 7.5 to 13 µm.

In a further embodiment of the invention, the pearlescent pigments have a size distribution with a $d_{50}$ value from a range from 2 to 10 µm, preferably from a range from 2.5 to 8 µm, more preferably from a range from 3 to 7.5 µm and even more preferably from a range from 3.5 to 6 µm.

In a preferable embodiment, the substrate of the pearlescent pigments has an average height (layer thickness) $h_S$ from a range from 40 to 150 nm, preferably from a range from 50 to 140 nm, more preferably from a range from 60 to 130 nm, even more preferably from a range from 70 to 120 nm and yet even more preferably from a range from 80 to 110 nm.

The standard deviation of the average height $h_S$ is preferably in a range from 25 to 80%, more preferably in a range from 28 to 60% and even more preferably in a range from 30 to 50%.

Below 40 nm layer thickness, the pearlescent pigments can be mechanically too fragile. Furthermore, the coating times with metal or high-refractive metal oxide are too long to be economically viable owing to the extremely high specific surface area. Specific surface area refers to the surface area per unit weight. Since the layer thickness of substrates of pearlescent pigments according to the invention is extremely small, these substrates have a very large surface area per unit weight compared with conventional substrates.

Pearlescent pigment substrate particle thickness and particle size are substantially dependent on each other as a consequence of the production process. Large particle sizes occasion correspondingly large particle thicknesses, and vice versa. The printability of printing inks, preferably ink-jet inks, according to the invention is decisively affected by pearlescent pigment particle size. Excessively coarse and hence correspondingly thick pearlescent pigments are less suitable for commercially available ink-jet printheads. Above 150 nm for an average height $h_S$ of the pearlescent pigment substrate, the printing inks, preferably ink-jet inks, according to the invention are not adequately printable in commercially available ink-jet printheads.

The extremely fine pearlescent pigments in the printing ink, preferably ink-jet ink, according to the invention are consequently based on a substantially transparent substrate having a low $d_{90}$ value and a low average layer thickness $h_S$.

This ensures printability in commercially available ink-jet printheads and also, surprisingly, a very good mechanical stability. At the same time, the pearlescent pigments have strong interference colors and thus are useful for strong-colored high-quality prints with pearl luster effect.

It is currently believed that $d_{90}/d_{95}$ and $h_S$ combinations hereinbelow are particularly suitable. These combinations hereinbelow provide very small and fine pearlescent pigments having at the same time surprisingly high mechanical stability when printing ink, preferably ink-jet ink, according to the invention is printed in commercially available ink-jet printheads. It was further extremely surprising that these small and fine pearlescent pigments have the wet-look luster typical of pearlescent pigments irrespective of their small size.

In a further embodiment, the printing inks, preferably ink-jet inks, according to the invention preferably contain pearlescent pigments whose $d_{90}$ value for the cumulative frequency distribution of the volume-averaged size distribution function is in a range from 3.5 to 15 µm and preferably in a range from 4 to 13 µm and whose average height $h_S$ is in a range from 40 to 150 nm and preferably in a range from 50 to 140 nm.

In a further preferable embodiment, the printing inks, preferably ink-jet inks, according to the invention contain pearlescent pigments whose $d_{90}$ value for the cumulative frequency distribution of the volume-averaged size distribution function is in a range from 4.5 to 12 µm and preferably in a range from 5 to 10 µm and whose average height $h_3$ is in a range from 60 to 130 nm and preferably in a range from 70 to 120 nm.

In a particularly preferable embodiment, the printing inks, preferably ink-jet inks, according to the invention contain pearlescent pigments whose $d_{90}$ value for the cumulative frequency distribution of the volume-averaged size distribution function is in a range from 5.1 to 8 µm and whose average height $h_s$ is in a range from 80 to 110 nm.

In a further embodiment according to the invention, the printing inks, preferably ink-jet inks, according to the invention contain pearlescent pigments whose $d_{95}$ value for the cumulative frequency distribution of the volume-averaged size distribution function is in a range from 5 to 20 µm and preferably in a range from 5.5 to 15 µm and whose average height $h_S$ is in a range from 40 to 150 nm and preferably in a range from 50 to 140 nm.

In a further embodiment, the printing inks, preferably ink-jet inks, according to the invention contain pearlescent pigments whose $d_{95}$ value for the cumulative frequency distribution of the volume-averaged size distribution function is in a range from 6 to 13 µm and preferably in a range from 6.5 to 10 µm and whose average height $h_S$ is in a range from 60 to 130 nm and preferably in a range from 70 to 120 nm.

In a further embodiment, the printing inks, preferably ink-jet inks, according to the invention contain pearlescent pigments whose $d_{90}$ value for the cumulative frequency distribution of the volume-averaged size distribution function is in a range from 3.5 to 15 µm and preferably in a range from 4 to 13 µm and whose $d_{95}$ value for the cumulative frequency distribution of the volume-averaged size distribution function is in the range from 5 to 20 µm and preferably in a range from 5.5 to 15 µm.

In a further embodiment, the printing inks, preferably ink-jet inks, according to the invention contain pearlescent pigments whose $d_{90}$ value for the cumulative frequency distribution of the volume-averaged size distribution function is in a range from 4.5 to 12 µm and preferably in a range from 5 to 10 µm and whose $d_{95}$ value for the cumulative frequency distribution of the volume-averaged size distribution function is in the range from 6 to 13 µm and preferably in a range from 6.5 to 10 µm.

In a preferable embodiment, the pearlescent pigments in the printing ink, in particular ink-jet ink, according to the invention include a single layer of metal oxide. Preferably, the relationship between the metal oxide content in % by weight, based on the total weight of metal oxide and substrate, and the average thickness of the metal oxide layer is preferably as follows:
a metal oxide content of 30-80% by weight coupled with an average metal oxide layer thickness of above 20 to 50 nm;
a metal oxide content of 50-85% by weight coupled with an average metal oxide layer thickness of above 50 to 75 nm;
a metal oxide content of 59-89% by weight coupled with an average metal oxide layer thickness of above 75 to 95 nm;
a metal oxide content of 66-92% by weight coupled with an average metal oxide layer thickness of above 95 to 125 nm;
a metal oxide content of 69-96% by weight coupled with an average metal oxide layer thickness of above 125 to 215 nm.

In a preferable version of the invention, the pearlescent pigments in the printing ink, in particular ink-jet ink, include a metal oxide layer of $TiO_2$ and/or $Fe_2O_3$ and a substrate of mica. The mica may be synthetic mica or natural mica.

It is particularly preferable for the relationship between the $TiO_2$ content in % by weight, based on the total weight of $TiO_2$ and mica, and the average thickness of the $TiO_2$ layer to be as follows:
a $TiO_2$ content of 35-62% by weight coupled with an average $TiO_2$ layer thickness of above 20 to 35 nm;
a $TiO_2$ content of 40-74% by weight coupled with an average $TiO_2$ layer thickness of above 35 to 45 nm;
a $TiO_2$ content of 45-78% by weight coupled with an average $TiO_2$ layer thickness of above 45 to 55 nm;
a $TiO_2$ content of 50-82% by weight coupled with an average $TiO_2$ layer thickness of above 55 to 65 nm;
a $TiO_2$ content of 55-85% by weight coupled with an average $TiO_2$ layer thickness of above 65 to 75 nm;
a $TiO_2$ content of 60-86.5% by weight coupled with an average $TiO_2$ layer thickness of above 75 to 85 nm;
a $TiO_2$ content of 65-88% by weight coupled with an average $TiO_2$ layer thickness of above 85 to 95 nm;
a $TiO_2$ content of 67-89% by weight coupled with an average $TiO_2$ layer thickness of above 95 to 105 nm;
a $TiO_2$ content of 68-90% by weight coupled with an average $TiO_2$ layer thickness of above 105 to 115 nm;
a $TiO_2$ content of 69-91% by weight coupled with an average $TiO_2$ layer thickness of above 115 to 125 nm;
a $TiO_2$ content of 70-92% by weight coupled with an average $TiO_2$ layer thickness of above 125 to 135 nm;
a $TiO_2$ content of 71-92.5% by weight coupled with an average $TiO_2$ layer thickness of above 135 to 145 nm;
a $TiO_2$ content of 72-93% by weight coupled with an average $TiO_2$ layer thickness of above 145 to 155 nm;
a $TiO_2$ content of 73-93% by weight coupled with an average $TiO_2$ layer thickness of above 155 to 165 nm;
a $TiO_2$ content of 73.5-93.5% by weight coupled with an average $TiO_2$ layer thickness of above 165 to 175 nm;
a $TiO_2$ content of 74-94% by weight coupled with an average $TiO_2$ layer thickness of above 175 to 185 nm;
a $TiO_2$ content of 74.5-94% by weight coupled with an average $TiO_2$ layer thickness of above 185 to 195 nm;
a $TiO_2$ content of 75-94.5% by weight coupled with an average $TiO_2$ layer thickness of above 195 to 205 nm;
a $TiO_2$ content of 75.5-95% by weight coupled with an average $TiO_2$ layer thickness of above 205 to 215 nm.

It is further preferable for the relationship between the $TiO_2$ content in % by weight, based on the total weight of $TiO_2$ and mica, and the average thickness of the $TiO_2$ layer to be as follows:

a $TiO_2$ content of 47.5-62% by weight coupled with an average $TiO_2$ layer thickness of above 20 to 35 nm;
a $TiO_2$ content of 58-74% by weight coupled with an average $TiO_2$ layer thickness of above 35 to 45 nm;
a $TiO_2$ content of 63-78% by weight coupled with an average $TiO_2$ layer thickness of above 45 to 55 nm;
a $TiO_2$ content of 67-82% by weight coupled with an average $TiO_2$ layer thickness of above 55 to 65 nm;
a $TiO_2$ content of 70-85% by weight coupled with an average $TiO_2$ layer thickness of above 65 to 75 nm;
a $TiO_2$ content of 73.5-86.5% by weight coupled with an average $TiO_2$ layer thickness of above 75 to 85 nm;
a $TiO_2$ content of 75-88% by weight coupled with an average $TiO_2$ layer thickness of above 85 to 95 nm;
a $TiO_2$ content of 76.5-89% by weight coupled with an average $TiO_2$ layer thickness of above 95 to 105 nm;
a $TiO_2$ content of 78.5-90% by weight coupled with an average $TiO_2$ layer thickness of above 105 to 115 nm;
a $TiO_2$ content of 80-91% by weight coupled with an average $TiO_2$ layer thickness of above 115 to 125 nm;
a $TiO_2$ content of 81.5-92% by weight coupled with an average $TiO_2$ layer thickness of above 125 to 135 nm;
a $TiO_2$ content of 83-92.5% by weight coupled with an average $TiO_2$ layer thickness of above 135 to 145 nm;
a $TiO_2$ content of 84-93% by weight coupled with an average $TiO_2$ layer thickness of above 145 to 155 nm;
a $TiO_2$ content of 85-93% by weight coupled with an average $TiO_2$ layer thickness of above 155 to 165 nm;
a $TiO_2$ content of 86-93.5% by weight coupled with an average $TiO_2$ layer thickness of above 165 to 175 nm;
a $TiO_2$ content of 87-94% by weight coupled with an average $TiO_2$ layer thickness of above 175 to 185 nm;
a $TiO_2$ content of 87.5-94% by weight coupled with an average $TiO_2$ layer thickness of above 185 to 195 nm;
a $TiO_2$ content of 88-94.5% by weight coupled with an average $TiO_2$ layer thickness of above 195 to 205 nm;
a $TiO_2$ content of 89-95% by weight coupled with an average $TiO_2$ layer thickness of above 205 to 215 nm.

It is very particularly preferable for the relationship between the $TiO_2$ content in % by weight, based on the total weight of $TiO_2$ and mica, and the average thickness of the $TiO_2$ layer to be as follows:

a $TiO_2$ content of 35-62% by weight coupled with an average $TiO_2$ layer thickness of above 20 to 35 nm;
a $TiO_2$ content of 40-74% by weight coupled with an average $TiO_2$ layer thickness of above 35 to 45 nm;
a $TiO_2$ content of 45-78% by weight coupled with an average $TiO_2$ layer thickness of above 45 to 55 nm;
a $TiO_2$ content of 50-82% by weight coupled with an average $TiO_2$ layer thickness of above 55 to 65 nm;
a $TiO_2$ content of 55-85% by weight coupled with an average $TiO_2$ layer thickness of above 65 to 75 nm;
a $TiO_2$ content of 60-86.5% by weight coupled with an average $TiO_2$ layer thickness of above 75 to 85 nm;
a $TiO_2$ content of 65-88% by weight coupled with an average $TiO_2$ layer thickness of above 85 to 95 nm;
a $TiO_2$ content of 67-89% by weight coupled with an average $TiO_2$ layer thickness of above 95 to 105 nm;
a $TiO_2$ content of 68-90% by weight coupled with an average $TiO_2$ layer thickness of above 105 to 115 nm;
a $TiO_2$ content of 69-91% by weight coupled with an average $TiO_2$ layer thickness of above 115 to 125 nm;
a $TiO_2$ content of 70-92% by weight coupled with an average $TiO_2$ layer thickness of above 125 to 135 nm;
a $TiO_2$ content of 71-92.5% by weight coupled with an average $TiO_2$ layer thickness of above 135 to 145 nm.

It is especially preferable for the relationship between the $TiO_2$ content in % by weight, based on the total weight of $TiO_2$ and mica, and the average thickness of the $TiO_2$ layer to be as follows:

a $TiO_2$ content of 47.5-62% by weight coupled with an average $TiO_2$ layer thickness of above 20 to 35 nm;
a $TiO_2$ content of 58-74% by weight coupled with an average $TiO_2$ layer thickness of above 35 to 45 nm;
a $TiO_2$ content of 63-78% by weight coupled with an average $TiO_2$ layer thickness of above 45 to 55 nm;
a $TiO_2$ content of 67-82% by weight coupled with an average $TiO_2$ layer thickness of above 55 to 65 nm;
a $TiO_2$ content of 70-85% by weight coupled with an average $TiO_2$ layer thickness of above 65 to 75 nm;
a $TiO_2$ content of 73.5-86.5% by weight coupled with an average $TiO_2$ layer thickness of above 75 to 85 nm;
a $TiO_2$ content of 75-88% by weight coupled with an average $TiO_2$ layer thickness of above 85 to 95 nm;
a $TiO_2$ content of 76.5-89% by weight coupled with an average $TiO_2$ layer thickness of above 95 to 105 nm;
a $TiO_2$ content of 78.5-90% by weight coupled with an average $TiO_2$ layer thickness of above 105 to 115 nm;
a $TiO_2$ content of 80-91% by weight coupled with an average $TiO_2$ layer thickness of above 115 to 125 nm;
a $TiO_2$ content of 81.5-92% by weight coupled with an average $TiO_2$ layer thickness of above 125 to 135 nm;
a $TiO_2$ content of 83-92.5% by weight coupled with an average $TiO_2$ layer thickness of above 135 to 145 nm.

In a further preferable embodiment, there is preferably the following relationship between the $Fe_2O_3$ content in % by weight, based on the total weight of $Fe_2O_3$ and mica, and the average thickness of the $Fe_2O_3$ layer:

an $Fe_2O_3$ content of 47.5-72.4% by weight coupled with an average $Fe_2O_3$ layer thickness of above 35 to 45 nm;
an $Fe_2O_3$ content of 57.5-82.4% by weight coupled with an average $Fe_2O_3$ layer thickness of above 45 to 55 nm;
an $Fe_2O_3$ content of 62.5-87.4% by weight coupled with an average $Fe_2O_3$ layer thickness of above 55 to 65 nm.

The pearlescent pigments in the printing ink, preferably ink-jet ink, according to the invention are structurally notable for a very high metal oxide content, for example a very high $TiO_2$ and/or $Fe_2O_3$ content, per pearlescent pigment.

The process which the invention provides for producing the printing ink, preferably ink-jet ink, according to the invention comprises the steps of (a1) classifying substantially transparent platelet-shaped substrates,
(b1) coating the classified substrate obtained in step (a1) with at least one optically active, preferably high-refractive, layer to obtain a pearlescent pigment having a $d_{90}$ value for the cumulative frequency distribution of the volume-averaged size distribution function from a range from 3.5 to 15 μm, or (a2) coating substantially transparent platelet-shaped substrates with at least one optically active, preferably high-refractive, layer,
(b2) classifying the pearlescent pigment obtained in step (a2) to obtain a pearlescent pigment having a $d_{93}$ value for the cumulative frequency distribution of the volume-averaged size distribution function from a range from 3.5 to 15 μm, and then (c) mixing the resulting pearlescent pigments with further constituents of the printing ink, in particular ink-jet ink, such as at least one solvent and/or at least one radiation-curable component and/or at least one binder.

Preferably, the substrate is initially classified, then coated with an optically active layer and the resulting pearlescent pigment then mixed with further constituents for producing the printing ink, preferably ink-jet ink.

Classifying the substantially transparent, preferably transparent, substrate of pearlescent pigments can be effected using various methods such as sedimentation in the gravity field, sedimentation in the decanter, sieving, use of a cyclone or hydrocyclone, spiral classification or a combination of two or more thereof. One method such as sieving for example can also be used in two or more successive steps.

Determining the average layer thicknesses and their distribution/standard deviation of a substrate can be effected, as known in the prior art, using SEM measurements. For this, the substrates or pearlescent pigments are incorporated in a varnish, for example by spraying or drawing down, applied to a base material, for example sheet metal or paperboard, and cured. Subsequently a polished section of the cured varnish is prepared and this polished section is investigated in the SEM measurements and the pigment particles are measured. To obtain statistically reliable values, at least 100 pigment particles should be counted. For the purposes of this invention, the determination of the layer thickness of the substrate and of the optically active layer, for example a metal oxide coating or a semitransparent layer of metal, can be effected using this method.

Care must be taken with this method that the pearlescent pigments are oriented in a substantially plane-parallel arrangement. This is to be understood as meaning that about 90% of the pearlescent pigments do not deviate from the average orientation by more than ±15° and preferably by not more than ±10°.

Poor orientation of pearlescent pigments in the varnish film will result in a significant measuring error. This is because, first, the pearlescent pigments in the polished section are tilted by an azimuthal angle $\alpha$ relative to the observer. Secondly, the surrounding medium of binder prevents any depth of field being obtained in the image, making it impossible for this angle to be estimated. Therefore, the layer thickness picture "seen" is enlarged by a factor of $1/\cos \alpha$. This factor is the cause of a significant error at larger angles. Depending on the magnitude of the angle $\alpha$, the layer thicknesses determined using this method can therefore be too high.

Preferably, for the purposes of this invention, the average substrate layer thickness $h_S$ of pearlescent pigments is determined as per the hereinbelow described process in order that more accurate results may be obtained. In the process according to the invention, the average substrate thickness is determined from the relationship between the metal oxide content and the layer thickness of the metal oxide. Finer and, as will be shown hereinbelow, especially thinner substrates have higher specific surface areas. When these thinner substrates are coated with a material, they have to be coated with more material to obtain a coating having a certain thickness than thicker substrates (per unit weight). This is reflected in a higher specific content of coating material in the overall pearlescent pigment, i.e., a higher content of coating material based on the weight of substrate used.

The process for determining the average substrate layer thickness $h_S$ of pearlescent pigments is based on the following model:

a) The pigments consist of cylinders (platelets) having a unitary radius $r_S$ and a unitary height $h_S$. Therefore, "mean values" are used from the start.

b) The probability of coating molecules depositing on the substrate is the same everywhere. There is accordingly no difference between, for example, the edge or the face area of the platelet layer thickness. As a consequence of this assumption, a unitary layer thickness $d_M$ results for the coating everywhere. The index M here stands for an optically active coating, preferably metal oxide and/or metal. The unitary thickness of coating is actually observed in SEM investigations on many coated platelet-shaped effect pigments.

c) Off-target precipitations of M are neglected, i.e., all the material of M ends up as a coating on the substrate.

The content of the coating M is defined as follows:

$$c_M = 100 * \frac{m_M}{m_M + m_S} \quad (\text{eq. 1})$$

where $m_M$ is the mass of the coating and $m_S$ is the mass of the substrate. These can also be expressed via the densities and volumes:

$$c_M = 100 * \frac{\rho_M \cdot V_M}{\rho_M \cdot V_M + \rho_S \cdot V_S} \quad (\text{eq. 2})$$

where $\rho_S$ and $\rho_M$ are the densities of the substrate and of the coating. The volume of the substrate is given by the following simple relationship (volume of the cylinder):

$$V_S = \pi r_S^2 h_S \quad (\text{eq. 3})$$

The volume of the coating material $V_M$ is calculated according to a model sketched in FIG. 1.

The volume of the deposited metal oxide divides in principle between the end faces and the edge, and is represented in three terms (see FIG. 1)

$$V_M = (V_{M,1} + V_{M,2} + V_{M,3}) \quad (\text{eq. 4})$$

$$V_M = \left[ 2\pi \cdot d_M (r_S)^2 + \left( \frac{4}{3}\pi \cdot d_M^3 + \pi^2 d_M^2 r_S \right) + (\pi \cdot d_M^2 h_S + 2\pi \cdot r_S \cdot d_M \cdot h_S) \right] \quad (\text{eq. 5})$$

where $h_S$ is the average height of the substrate, $r_S$ is the average diameter of the substrate and $d_M$ is the height of the layer thickness of the metal oxide.

Combining these equations will finally result in the following expression:

$$c_M = \frac{100}{1 + \frac{\rho_S}{\rho_M} * \frac{h_S \cdot r_S^2}{\left(\frac{4}{3}d_M^3 + (\pi \cdot r_S + h_S) \cdot d_M^2 + (2r_S^2 + 2r_S h_S) \cdot d_M\right)}} \quad (\text{eq. 6})$$

Rearranging this equation to solve for the average substrate thickness $h_S$, the following expression is obtained:

$$h_S = \frac{\frac{4d_M^3}{3r_S^2} + \frac{\pi d_M^2}{r_S} + 2 \cdot d_M}{\frac{\rho_S}{\rho_M \cdot \left(\frac{100}{c_M} - 1\right)} - \left(\frac{d_M}{r_S}\right)^2 - 2 \cdot \frac{d_M}{r_S}} \quad \text{(eq. 7)}$$

In the context of this invention, the average substrate thickness $h_S$ of pearlescent pigments is preferably defined via this equation when the layer thickness $d_M$ is in the range from 40 to 180 nm.

The formula is inaccurate in the case of greater layer thicknesses because, owing to the high level of optically active coating material, the $c_M$ content approaches a limiting value. At low layer thicknesses, good differentiation is likewise not possible.

The average radius of the substrate is preferably determined via laser diffraction measurements on the pearlescent pigments, preferably by laser granulometry using Cilas 1064 from Cilas. The $d_{50}$ value for the cumulative size distribution curve is enlisted; the relationship which applies is then as follows:

$$d_{50}/2 = r_S \quad \text{(eq. 8)}$$

The size $c_M$ is determined via analytical measurements. Preferably an x-ray fluorescence analysis (XRFA) is performed on finely divided pigment material. The pigment powder is optionally first comminuted in a mill or a mortar in order that a unitary sample of material may be provided. Alternatively, the pearlescent pigment can also be dissolved using hydrofluoric acid for example and the XRFA analysis subsequently carried out on the solution.

The analytical contents of substrate and optically active material can further also be determined via inductively coupled plasma (ICP).

The density values preferably come from the literature (Handbook Chemistry and Physics). Typical values are for example:

TABLE 1

Densities of customary materials of pearlescent pigments

| Material | Density | Function |
|---|---|---|
| mica | 2.7 | substrate |
| $Al_2O_3$ | 4.0 | substrate (predominantly) |
| $SiO_2$ | 2.2-2.7 | substrate (predominantly) |
| $TiO_2$ (rutile) | 4.3 | coating |
| $TiO_2$ (anatase) | 3.9 | coating |
| $Fe_2O_3$ (hematite) | 5.2 | coating |
| $Fe_3O_4$ (magnetite) | 5.2 | coating |

When mixed layers formed from two or more high-refractive layers are used, the density of the coating can be calculated from the literature values by weighting with the analytically available weight ratios for the individual materials.

The layer thickness of the metal oxide finally can be determined for example, and preferably is determined, via the color of the pearlescent pigment. The underlying physical formulae for the optics of pearlescent pigments are set out in C. Schmidt, M. Fritz "Optical Physics of Synthetic Interference Pigments" Kontakte (Darmstadt) 1992 (2) pp. 15-24.

When the difference between the layer thickness measured via SEM polished sections and the layer thickness determined from the particular color is too large, i.e., the difference between these two values is greater than 10%, $h_3$ can be calculated using the layer thickness measured via SEM polished sections.

The color can also be determined via a suitable computer program such as Filmstar software from FTG Software Associates, USA. For this, the optical constants (refractive index n and, where appropriate, absorption constant k) of the optically active layer in the region of the optical wavelengths (400 to 800 nm) have to be used. Such values are well known for the commonly used materials.

The layer thickness can furthermore be determined using color on the basis of publicly available information. For example, $TiO_2$-coated pearlescent pigments based on mica are governed by the following known relationship:

TABLE 2

Typical colors and layer thicknesses of pearlescent pigments

| | Coating/layer thickness | Color |
|---|---|---|
| Silvery white pearlescent pigments | $TiO_2$: 40-60 nm | silver |
| Interference pigments | $TiO_2$: 60-80 nm | yellow |
| | $TiO_2$: 80-100 nm | red |
| | $TiO_2$: 100-140 nm | blue |
| | $TiO_2$: 120-160 nm | green |
| | $TiO_2$: 280-320 nm | green (IIIrd order) |
| Colorescent pigments | $Fe_2O_3$: 35-45 nm | bronze |
| | $Fe_2O_3$: 45-55 nm | copper |
| | $Fe_2O_3$: 55-65 nm | red |
| | $Fe_2O_3$: 65-75 nm | reddish violet |
| | $Fe_2O_3$: 75-85 nm | reddish green |

In most cases, the color is determined almost exclusively by the thickness of the high-refractive coating (F. Hofineister, Farbe+Lack 95, 557 (1989)).

Especially in the case of pearlescent pigments having a large standard deviation for the substrate thickness distribution, the coloring is substantially not dependent on the average thickness of the substrate, but is substantially determined by the thickness of the high-refractive layer.

In the event that the substrate with its layer thickness likewise determines the interference color in a manner which cannot be neglected, a more precise optical calculation has to be used. In this case, the layer thickness of the substrate and also of the optically active layer, preferably of the high-refractive metal oxide layer, can be determined for example using the positions of the maxima and/or minima in the reflectance spectrum of pearlescent pigments.

In the event that the pearlescent pigment includes a mixed coating of two or more high-refractive oxides, the optical constants must be calculated, similarly to the density calculation, from a weighting from the analytically available weight ratios of the individual high-refractive oxides.

If, by contrast, the pearlescent pigment includes a combination of two high-refractive oxides, the model can be used nonetheless. In the case of the first coating with high-refractive metal oxide, equation (7) can be used directly. The calculation for the second high-refractive oxide, however, must take the layer thickness of the first oxide into account.

The thickness of the optically active layer, preferably of the high-refractive metal oxide layer can also be determined by the SEM counting of correctly oriented polished sections of the pearlescent pigments.

A further method of determining the average substrate layer thickness consists in the thicknesses of the (coated) pearlescent pigments being prepared as per the method described in WO 2004/087816 A2 and likewise measured in the SEM. At least 100 pigment particles should be measured in order that meaningful statistics may be obtained. Thereafter, the arithmetic mean is determined. It represents the average thickness of the pearlescent pigment $d_{tot}$ and naturally:

$$d_{tot} = 2d_M + h_S \quad \text{(eq. 9)}$$

Proceeding from equation (7), $d_M$ can be eliminated using equation (9) to solve for $h_S$. The higher terms of $h_S$ can be neglected to good approximation, and in this way $h_S$ can be determined from the relationship between the content of optically active layer $c_M$ and the average pigment total layer thickness $d_{dot}$.

The processes for determining the average substrate layer thickness which are based on equation (7) can also be applied generally to platelet-shaped effect pigments. These have a platelet-shaped substrate and also a coating. The platelet-shaped substrate also comprises metal pigments.

In further embodiments according to the invention, the pearlescent pigments include at least one further low-refractive layer. This layer can be disposed between the substrate and the high-refractive layer or on the high-refractive layer. In the case of natural or synthetic mica, such a layer is analytically readily distinguishable. Mica has characteristic impurities although its main constituent is silicate. Owing to these impurities, an $SiO_2$ coating of mica can be distinguished and equation (7) applied appropriately, for example. The layer construction is also analyzable using for example polished sections and/or electron spectroscopy for chemical analysis (ESCA).

The amount of pearlescent pigment used in the printing ink, preferably ink-jet ink, according to the present invention is preferably in the range from 0.1% to 30% by weight, more preferably in the range from 0.2% to 20% by weight, more preferably in the range from 0.3% to 10% by weight, even more preferably in the range from 0.5% to 7% by weight and yet even more preferably in the range from 1% to 5% by weight based on the total weight of printing ink, in particular ink-jet ink.

Particle size is the decisive factor governing the printability of pearlescent pigments in ink-jet printheads. There was found to be a critical upper limit in the particle size distribution of pearlescent pigments for use in typical industrial ink-jet printheads, for example XAAR 1001, Xaar XJ126/80 or Spectra Nova 256. The pearlescent pigments used in the printing ink, especially ink-jet ink, according to the invention have $d_{90}$ values below 15 μm, preferably below 13 atm, more preferably below 12 μm, even more preferably below 10 μm and yet even more preferably below 8 μm.

To achieve a resolution of 300 dpi or better, there are various further factors in addition to the fineness of the pearlescent pigment used, such as the nozzle size of the ink-jet printhead, diameters of internal channels or the presence of filters in the ink-jet printhead. These design-based properties of the ink-jet printhead may cause an accumulation of pearlescent pigments or cloggage by pearlescent pigments at different points of the ink-jet printhead, and this can finally lead to a deterioration in the printed image and/or the printing ink, preferably ink-jet ink, used no longer being printable.

Comparatively fine pearlescent pigments are slower to sediment than comparatively coarse pearlescent pigments. Even design-based narrow places in the ink-jet printhead, such as thin channels, are substantially not blocked by comparatively fine pigments, if at all.

To inhibit deposits/cloggages of pearlescent pigments, the printing ink, preferably ink-jet ink, containing pearlescent pigments, can be maintained in continuous agitation in the ink-jet system used. In this way, sedimentation of pearlescent pigments in the printing ink, preferably ink-jet ink, can be substantially and preferably entirely prevented.

The printing ink, preferably ink-jet ink, according to the invention in addition to pearlescent pigments, contains at least one solvent and/or at least one radiation-curable component and/or at least one binder and optionally one additive or two or more additives.

The solvent- and/or water-based printing ink, preferably ink-jet ink, preferably comprises a solvent content between 10% and 95% by weight, preferably between 20% and 94% by weight and more preferably between 50% and 93% by weight based on the total weight of the printing ink, preferably ink-jet ink.

The evaporation number of the solvent is preferably in the range between 10 and 300, more preferably between 20 and 250 and even more preferably between 80 and 200.

The evaporation number is defined to DIN 53170 relative to ether at 20° C.

Any solvent or solvent mixture suitable for printing, in particular ink-jet printing, can be used. Preferred solvents are water, alcohols, esters, ethers, thioethers, glycol ethers, glycol ether acetates, amines, amides, ketones and/or hydrocarbons or mixtures thereof.

Examples of alcohols are alkyl alcohols such as for example methanol, ethanol, propanol, isopropanol, butanol, pentanol, hexanol, fluorinated alcohols or mixtures thereof.

Examples of ketones useful as solvents are acetone, methyl ethyl ketone, cyclohexanone, diisobutyl ketone, methyl propyl ketone, diacetone alcohol or mixtures thereof.

Examples of esters are methyl acetate, ethyl acetate, 1-methoxy-2-propyl acetate, propyl acetate, ethoxypropyl acetate, butyl acetate, methyl propionate or ethyl propionate, glycol ether acetates, butylglycol acetate, propylene glycol diacetate, ethyl lactate or mixtures thereof.

Examples of ethers useful as solvents are diethyl ether, dipropyl ether, tetrahydrofuran, dioxane, ethylene glycol ether, especially ethylene glycol ethyl ether or ethylene glycol methyl ether, methoxypropanol, dipropylene glycol dimethyl ether, 3-methoxy-3-methyl-1-butanol, propylene glycol butyl ether or mixtures thereof.

Examples of amides useful as solvents are N-methyl-pyrrolidone and 2-pyrrolidone.

The hydrocarbons may be selected from the group consisting of terpenes, such as pinene, limonene, terpinolene, aliphatic hydrocarbons such as heptane, white spirit, Stoddard Solvent and/or aromatic hydrocarbons such as toluene, xylene, Solvent Naphtha or mixtures thereof.

Suitable solvents are more particularly selected from the group consisting of alcohols, glycol ethers, esters, ketones or mixtures thereof. Solvent for the purposes of the present invention is to be understood as meaning a single solvent or a solvent mixture.

Particularly preferable solvents are isopropanol, ethanol, butanol, diisobutyl ketone, butylglycol, butylglycol acetate, propylene glycol diacetate, dipropylene glycol dimethyl ether, ethyl lactate or ethoxypropyl acetate.

In a further embodiment, the solvent/solvent mixture in ink-jet inks used in the drop-on-demand (DOD) technology preferably have a flashpoint of at least 61° C. or higher. This ensures that the printing presses should not have to be located in an explosion-protected area or be given an explosion-protected design. Furthermore, storing and transporting such a printing ink, preferably ink-jet ink, is safer.

In a further embodiment, the printing ink, preferably ink-jet ink, is a radiation-curable ink, more particularly a UV light-curable ink, hereinafter a UV-curable ink, containing from 0% to 50% by weight of solvent, based on the total weight of the printing ink, preferably ink-jet ink. Since normally no solvent is needed in UV-curable inks, the solvent content is preferably in the range from 0% to 10% by weight, based on the total weight of the printing ink, preferably ink-jet ink. In a particularly preferable embodiment, the UV-curable ink-jet ink contains no solvent.

In a further embodiment of the invention, the printing ink, preferably ink-jet ink, has a surface tension of 20 to 50 mN/m. When the surface tension is below 20 mN/m, the printing ink, preferably ink-jet ink, will flow over the surface of the printhead, leading to difficulties with the ejection of ink droplets. In addition, the ink will spread on the substrate to be printed, resulting in a poor printed image. When the surface tension is above 50 mN/m, the substrate to be printed cannot be wetted and the ink does not spread on the substrate to be printed.

In a further embodiment for radiation-curable printing ink, preferably ink-jet ink, particularly for UV-curable ink-jet inks, the radiation-curable component also acts as binder. The amount of radiation-curable component used, examples of which are liquid oligomers and monomers, is in a range between 1% and 99% by weight, preferably in a range between 30% and 80% by weight and more preferably in a range between 40% and 75% by weight based on the total weight of printing ink, preferably ink-jet ink.

Therefore, in one embodiment of the invention, the radiation-curable component can accordingly be a binder.

The radiation-curable ink-jet ink preferably contains photoinitiators as well as the radiation-curable component. These photoinitiators can be in the form of a solution in a radiation-curable component or in the form of a solid material.

In a further embodiment of the present invention, the printing ink, preferably ink-jet ink, comprises a binder in a range between 0.1% and 99% by weight, based on the total weight of printing ink, preferably ink-jet ink. The printing inks, preferably ink-jet inks, are preferably solvent-based systems.

Depending on the substrate to be printed, the printing ink, preferably ink-jet ink, has a or no binder added to it. If the binder is already present in the substrate to be printed, as is the case in specialty ink-jet printing paper for example, there is no need to add a binder to the printing ink, preferably ink-jet ink.

In a further preferable embodiment of the present invention, the printing ink, preferably ink-jet ink, is based on solvent(s) and/or water and comprises a binder in a range from 0.1% to 50% by weight, preferably in the range from 1% to 35% by weight and more preferably in the range from 2% to 25% by weight and even more preferably in the range from 0.2% to 15%, all based on the total weight of the printing ink, preferably ink-jet ink.

The binder used can be any binder customarily used in printing inks, in particular ink-jet inks. The following binders may be mentioned as preferable, although no limitation is implied: UV-curable acrylic monomers and oligomers, various resins such as hydrocarbon resins, modified rosins, polyethylene glycol resins, polyamide resins, polyvinyl butyral resins, polyvinylpyrrolidone resins, polyester resins, polyurethane resins, polyacrylic resins, polyacrylamide resins, polyvinyl chloride resins, ketone resins, phenolic resins, polyvinyl alcohol resins, modified cellulose resins or modified nylon resins or other resins soluble or finely dispersible in organic solvents and/or water, or mixtures thereof.

In a further embodiment, the printing ink, preferably ink-jet ink, according to the invention can be in solid form, for example as small blocks of wax, not liquid form, and only be melted in the ink system. Ink system is to be understood as referring to the entire supply system of the printer, such as reservoir containers, flexible tubes, channels or valves. Such meltable printing inks, preferably ink-jet inks, are also known as phase change ink. When such small blocks of wax are used, the reservoir container is heated and the ink is then fed to the printhead via heated flexible tubes etc.

Preferably, the printing ink, preferably ink-jet ink, comprises additional additives, for example dispersing agents, antisettling agents, humidifying agents, wetting agents including anticratering or flow control additives, biocides, pH regulators, plasticizers, UV stabilizers or mixtures thereof.

Dispersing agents help to achieve a homogeneous dispersion of all solid constituents in the ink-jet ink. More particularly, any possible agglomeration of pearlescent pigments is avoided.

The printing ink, preferably ink-jet ink, composition according to the invention may contain a dispersing agent. Useful dispersing agents include all commonly used dispersing agents which are used in a customary printing ink, in particular ink composition, such as gravure printing ink, offset ink, intaglio ink or screen printing ink. Commercially available products can be used as dispersing agents. Examples thereof include Solsperse 20000, 24000, 3000, 32000, 32500, 33500, 34000 and 35200 (from Avecia K.K.) or Disperbyk-102, 106, 111, 161, 162, 163, 164, 166, 180, 190, 191 and 192 (from BYK-Chemie GmbH).

In a further embodiment, the printing inks, preferably ink-jet inks, of the present invention contain antisettling agents. These substances are said to prevent the settling of platelet-shaped pearlescent pigments in the printing ink, preferably ink-jet ink. Examples thereof of Byk-405 in conjunction with pyrogenous silica, modified ureas such as Byk-410 or Byk-411 or waxes such as Byk Ceramat 237, Ceramat 250, Cerafak 103, Cerafak 106 or Ceratix 8461.

Humidifying agents are used in water-based printing inks, more particularly ink-jet inks, to avoid any drying out, particularly during the presence of the ink in the printhead. Humidifying agents reduce the rate of evaporation and inhibit the deposition of solids at the time evaporation occurs at the ink-jet nozzle. Humidifying agents are preferably selected from the group consisting of polyols, such as glycols, glycerol, sorbitols, polyvinyl alcohols, glycol ethers and mixtures thereof.

Wetting agents serve to improve the wetting of the substrate to be printed. Wetting agents are also important for the functioning of the printhead, since internal structures, for example channels, filters, nozzle antechambers, etc. are also wetted. Examples of suitable wetting agents include fatty acid alkyl ethers, acetylene derivatives, fluorinated esters, fluorinated polymers.

Biocides can be incorporated in printing inks, in particular ink-jet inks, to prevent any growth of microorganisms. Useful examples include polyhexamethylenebiguanides, isothiazolones, isothiazolinones, for example 5-chloro-2-methyl-4-isothiazolin-3-one (CIT), 2-methyl-4-isothiazolin-3-one (MIT), etc. or mixtures thereof.

Ammonia or amines such as triethanolamine or dimethylethanolamine can be added to the printing ink, in particular ink-jet ink, to adjust the pH.

Useful plasticizers for addition to the printing ink, in particular ink-jet ink, include for example citric esters, adipic esters, phosphoric esters and higher alcohols.

2,6-Di-tert-butylphenol is an example of a UV stabilizer that can be added to the printing ink, preferably ink-jet ink, according to the invention.

A printing ink, in particular ink-jet ink, containing pearlescent pigments is able to endow the substrate to be printed with the wet-look luster typical of pearlescent pigments while at the same time the substrate is translucent. A substrate printed with a printing ink, in particular ink-jet ink, containing pearlescent pigments can be further overprinted, if desired. Alternatively, the substrate to be printed may initially be printed with a printing ink, in particular ink-jet ink, containing pearlescent pigments and then be overprinted with one or more process inks. It is further possible to print a printing ink, in particular ink-jet ink, containing pearlescent pigments together with one or more process inks. Printing the printing ink, in particular ink-jet ink, containing pearlescent pigments after, before or together with further spot colors, for example printing inks, in particular ink-jet inks, containing metallic effect pigments, is also possible. Pearlescent pigments differ from metallic effect pigments in being distinctly more water-resistant and hence less reactive in aqueous printing inks, in particular ink-jet inks.

In addition to pearlescent pigments, various colorants can be incorporated in the printing ink, preferably ink-jet ink. Examples of what can be used in the present invention are: various black colorants such as C.I. Solvent Blacks 27, 28, 29, 35, 45; C.I. Pigment Black 7; various blue colorants such as C.I. Direct Blues 86, 199; C.I. Solvent Blues 25, 44, 48, 67, 70; C.I. Pigment Blue 15:3; various red colorants such as C.I. Acid Red 52; C.I. Reactive Red 180; C.I. Solvent Reds 49, 172; C.I. Disperse Red 60; C.I. Pigment Red 122 and/or various yellow colorants such as C.I. Acid Yellow 23; C.I. Direct Yellow 86; C.I. Direct Yellow 132; C.I. Disperse Yellow 119; C.I. Reactive Yellow 37; C.I. Solvent Yellow 162; C.I. Solvent Yellow 146; C.I. Pigment Yellow 17 or C.I. Pigment Yellow 86 or C.I. Pigment Yellow 155.

In addition to pearlescent pigments and optionally colorant(s), the printing ink, preferably ink-jet ink, may further contain metallic effect pigments.

In a further embodiment of the invention, the viscosity of printing ink, preferably ink-jet ink, is in a range from 1 to 100 mPa·s, measured with an R/S rheometer from Brookfield having a double slot cylinder measuring system to DIN 54453 with a stipulated 150 rpm at 25° C. The viscosity of the printing ink, in particular ink-jet ink, is preferably in a range from 3 to 30 mPa·s and more preferably in the range from 5 to 20 mPa·s.

The solvent-based printing ink, preferably ink-jet ink, of the present invention preferably has a viscosity of to 20 mPa·s, measured with an R/S rheometer from Brookfield having a double slot cylinder measuring system to DIN 54453 with a stipulated 150 rpm at 25° C., a surface tension of 20 to 45 mN/m, measured at a temperature of 25° C. with du Nouy's ring method, and a conductivity of 0 to 5 mS/cm, measured at a temperature of 25° C. to DIN 53779 or a corresponding manner.

The water-based printing ink, in particular ink-jet ink, of the present invention preferably has a viscosity of 1 to 15 mPa·s, measured with an R/S rheometer from Brookfield having a double slot cylinder measuring system to DIN 54453 with a stipulated 150 rpm at 25° C., a surface tension of 20 to 80 mN/m, measured at a temperature of 25° C. with du Nouy's ring method, a pH of 6 to 11 in water-based printing inks and a conductivity of 0 to 5 mS/cm, measured at a temperature of 25° C. to DIN 53779 or a corresponding manner.

The radiation-curable printing ink, in particular ink-jet ink, of the present invention preferably has a viscosity of 6 to 20 mPa·s, measured with an R/S rheometer from Brookfield having a double slot cylinder measuring system to DIN 54453 with a stipulated 150 rpm at 25° C., a surface tension of 20 to 45 mN/m, measured at a temperature of 25° C. with du Nouy's ring method, and a conductivity of 0 to 5 mS/cm, measured at a temperature of 25° C. to DIN 53779 or a corresponding manner.

The viscosity can be adapted to the printhead to be used, to the substrate to be printed and/or to the composition of the printing ink, in particular ink-jet ink.

The printing ink, in particular ink-jet ink, of the present invention can be applied to different substrates to be printed. The substrate is preferably selected from the group consisting of coated or uncoated paper or paperboard, polymeric substrates (plastics), metals, ceramics, glass, textiles, leather or of combinations thereof. The most preferred substrates consist of polymeric substrates (plastics), such as polymeric films/sheets (e.g., PVC or PE films/sheets).

An important aspect of the process which the invention provides for producing a printing ink, in particular ink-jet ink, is that the pearlescent pigments are not damaged by mixing with the other constituents of the printing ink, in particular ink-jet ink.

For example, the constituents of the printing ink, in particular ink-jet ink, of the present invention can be mixed in an ultrasonic bath and then using a magnetic stirrer.

The printing ink, in particular ink-jet ink, according to the present invention can be used with any possible ink-jet technology. The ink-jet ink according to the invention can be used in various ink-jet printing systems. The ink-jet printing systems may on the one hand be systems wherein droplets are electrostatically charged and deflected (continuous ink-jet processes). It is also possible to use ink-jet printing systems in which droplets are formed by pressure waves generated by piezoelectric elements or by expanding bubbles of vapor (drop-on-demand processes).

The printing ink, more particularly ink-jet ink, of the present invention is preferably used with continuous ink-jet technology—CIJ—or impulse or drop-on-demand ink-jet technology—DOD.

A resolution of at least 300 dpi is expected as standard to ensure good quality of printing.

The pearlescent pigments in the printing ink, in particular ink-jet ink, according to the invention can also be added to the ink in the form of a pigment formulation, for example as pellet or granulate or liquid dispersion. The proportion of pearlescent pigments in pigment formulations of this type is typically in a range from 10% to 95% by weight, preferably in a range from 30% to 95% by weight and more preferably in a range from 40% to 90% by weight, all based on the total weight of the pigment formulation.

The printing ink according to the invention is preferably an ink-jet printing ink.

The examples which follow elucidate the invention without restricting it.

EXAMPLES

Example 1a 1 kg of Mica MD 2800 muscovite mica from Minelco Specialities Ltd. England was calcined at 700° C. for 1 h, then admixed with 1000 mL of completely ion-free water and then delaminted for about 1 h in a laboratory muller from American Cyanamid Company. The resulting cake was subsequently adjusted with completely ion-free water to 35% by weight solids content and sieved to 25 μm via a laboratory sieve of the Separator type from Sweco.

The fine fraction of Mica thus obtained was then treated for 5 h in a TD 200 laboratory dissolver from Pendraulik. Care must be taken here to ensure by cooling that the temperature of the suspension does not exceed 80° C.

The Mica suspension was then diluted with completely ion-free water to 3% by weight solids content and sedimented off for 5 h via a sedimentation vessel. The supernatant was drawn off with suction, and the sediment was again taken up in water, vigorously stirred and again sedimented off for 5 h. This operation was repeated 4 times in total until there was virtually no longer any apparent supernatant. The sedimentation vessel had a cylindrical shape measuring: d=50 cm; h=50 cm.

The Mica from the supernatants was collected in a large container and caused to settle by addition of NaCl. After about 48 h, the clear supernatant salt solution was drawn off with suction and the filter cake obtained was used as starting material for further coatings.

Example 1b 1 kg of Mica MD 2800 muscovite mica from Minelco Specialities Ltd. England was admixed with 1000 mL of completely ion-free water and then delaminted for about 2 h in a laboratory muller from American Cyanamid Company.

The resulting cake was subsequently adjusted with completely ion-free water to 35% by weight solids content and sieved to <25 μm via a laboratory sieve of the Separator type from Sweco.

The fine fraction of Mica thus obtained was then treated for 5 h in a TD 200 laboratory dissolver from Pendraulik. Care must be taken here to ensure by cooling that the temperature of the suspension does not exceed 80° C.

The Mica suspension was then diluted with completely ion-free water to 3% by weight solids content and sedimented off for 5 h via a sedimentation vessel. The supernatant was drawn off with suction, and the sediment was again taken up in water, vigorously stirred and again sedimented off for 5 h. This operation was repeated 4 times in total until there was virtually no longer any apparent supernatant.

The sedimentation vessel had a cylindrical shape measuring: d=50 cm; h=50 cm.

The Mica from the supernatants was collected in a large container and caused to settle by addition of NaCl. After about 48 h, the clear supernatant salt solution was drawn off with suction and the filter cake obtained was used as starting material for further coatings.

Example 2

100 g of platelet-shaped muscovite mica according to Example 1a were suspended in completely ion-free water. A pH of 2.2 was set by metered addition of dilute hydrochloric acid and the suspension was heated to 80° C. Then, 50 mL of a tin chloride solution with c(Sn)=24 g/l were metered in over 90 min. The pH was held constant at 2.2 by simultaneous introduction of a 15% by weight strength alkaline earth metal hydroxide solution. After an interruption of about ¼ h, during which the stirring of the mica was continued, the pH of the solution was adjusted to 1.8 by metered addition of dilute hydrochloric acid. Subsequently, the addition was commenced of 2.4 L of a solution of 150 g of $TiCl_4$ and 50 g of HCl per liter. The pH was kept constant by simultaneous introduction of a 15% strength alkaline earth metal hydroxide solution.

On completion of the addition a vigorous, silvery pearl luster was obtained. The suspension was cooled down by subsequent stirring for 1 h, filtered with suction through a Büchner funnel and washed with completely ion-free water until almost ion-free.

Finally, the pigment was calcined at 800° C. for 20 minutes.

Example 3

100 g of platelet-shaped muscovite mica according to Example 1b were suspended in completely ion-free water. A pH of 2.2 was set by metered addition of dilute hydrochloric acid and the suspension was heated to 80° C. Then, 50 mL of a tin chloride solution with c(Sn)=24 g/l were metered in over 90 min. The pH was held constant at 2.2 by simultaneous introduction of a 15% by weight strength alkaline earth metal hydroxide solution. After an interruption of about ¼ h, during which the stirring of the mica was continued, the pH of the solution was adjusted to 1.8 by metered addition of dilute hydrochloric acid. Subsequently, the addition was commenced of 2.4 L of a solution of 150 g of $TiCl_4$ and 50 g of HCl per liter. The pH was kept constant by simultaneous introduction of a 15% strength alkaline earth metal hydroxide solution.

On completion of the addition a vigorous, silvery pearl luster was obtained. The suspension was cooled down by subsequent stirring for 1 h, filtered with suction through a Büchner funnel and washed with completely ion-free water until almost ion-free.

Finally, the pigment was calcined at 800° C. for 20 minutes.

Example 4

100 g of commercially available ECR glass from Glassflake Ltd. (GF100NM) having an average size of about 95 nm and a size $d_{50}$=7 μm were suspended in completely ion-free water. A pH of 2.2 was set by metered addition of dilute hydrochloric acid and the suspension was heated to 80° C. Then, 50 mL of a tin chloride solution with c(Sn)=24 g/l were metered in over 90 min. The pH was held constant at 2.2 by simultaneous introduction of a 15% by weight strength alkaline earth metal hydroxide solution. After an interruption of about ¼ h, during which the stirring of the mica was continued, the pH of the solution was adjusted to 1.8 by metered addition of dilute hydrochloric acid. Subsequently, the addition was commenced of 5.6 L of a solution of 150 g of $TiCl_4$ and 50 g of HCl per liter. The pH was kept constant by simultaneous introduction of a 15% strength alkaline earth metal hydroxide solution.

On completion of the addition a vigorous, red pearl luster was obtained. The suspension was cooled down by subsequent stirring for 1 h, filtered with suction through a Büchner funnel and washed with completely ion-free water until almost ion-free.

Finally, the pigment was calcined at 550° C. for 40 minutes.

Example 5

Commercially available $TiO_2$-coated silvery pearlescent pigment Magna Pearl 3100 Silver (from BASF Catalysts).

Example 6

Commercially available $TiO_2$-coated silvery pearlescent pigment Prestige Soft Silber (from Eckart GmbH).

These pigments are based on a mica having a $d_{50}$ value for 6.5 μm and an average thickness of 119 nm.

Example 7

Commercially available $TiO_2$-coated silvery pearlescent pigment Iriodin 111 (from Merck KGaA).

Comparative Example 1

Commercially available TiO$_2$-coated silvery pearlescent pigment Iriodin 120 (from Merck KGaA).

Comparative Example 2

Commercially available TiO$_2$-coated silvery pearlescent pigment Magna Pearl 1000 Silver (from BASF Catalysts).

Example 8

Water-Based Ink-Jet Ink (Drop-on-Demand Process)

1 g of pearlescent pigment from Example 2
68.2 g of completely ion-free water
25 g of diethylene glycol
6 g of 1,6-hexanediol
0.5 g of Genapol X080 (Clariant, Germany)
0.3 g of Acticide MBS The mixture was stirred for 10 minutes. Filtration through 20 μm metal mesh filter.

Printing Test:

The ink-jet ink was filled into the black cartridge of a commercially available ink-jet printer.
Printhead: HP 51645A
Printing conditions: best
Paper: HP transparent ink jet film The prints exhibit a silvery pearlescence. There was no nozzle cloggage. The pigment had to be resuspended after printing breaks.

Example 9

Solvent-Based Ink-Jet Ink (Drop-on-Demand Process)

2 g of pearlescent pigment from Example 2
90.5 g of butylglycol acetate
7 g of Pioloform BN18
0.5 g of Fluorad FC 4430 (from 3M Specialty Materials)

The mixture was stirred for 60 minutes. Filtration through 20 μm metal mesh filter.

Printing Test:

The ink-jet ink was initially charged to a stirrer-equipped vessel and pumped from there into the ink supply system of an ink-jet printhead. Printhead temperature was adjusted so as to give the requisite viscosity of 8-20 mPa·s.
Printhead: Xaar 1001
Printing conditions: Ink temperature 40° C.
  Droplet generation frequency
  1.5 kHz
  3 dpd gray scale setting
Paper: Canon Microporous Foto Paper The ink-jet ink was printed without nozzle outages. The prints exhibited a silvery pearlescence effect and good ruboff resistance.

Physical Characterization I of Ink-Jet Ink

To demonstrate the printing properties of various pearlescent pigments, solvent-based ink-jet inks were prepared and printed up. The assessment included printhead cloggage and hiding power of the inks before and after printing.

A printhead cloggage is due to the blocking of fine channels or filters and manifests in a higher flow resistance of the printhead.

The resulting prints as well as the inks before and after passage through the printhead were subsequently characterized.

In the printing tests, the resolution should be at least 300 dpi.

To characterize the printing inks, these were collected, during the printing operation, in a container immediately after passage through the printhead. A portion of this printing ink and also the original printing ink were then subjected to the respective methods of determination.

Ia Particle Size Measurement

The pigments of inventive and comparative examples were characterized using laser diffraction methods (Cilas 1064 instrument) as powders as well as in the corresponding ink before and after printing (passage through the printhead).

To characterize the powder, 0.5 g of pigment was mixed with 50 mL of isopropanol using a magnetic stirrer and then ultrasonicated for 300 seconds in a Sonorex IK 52 from Bandelin. 2-3 mL of sample substance were then pipetted into the sample intake of the Silas 1064 instrument for measurement.

The printing inks were measured by weighing 1.5 g of ink onto 40 mL of isopropanol. The suspension was subsequently mixed using a magnetic stirrer and then ultrasonicated for 300 seconds in a Sonorex IK 52 from Bandelin. 2-3 mL of sample substance were then pipetted into the sample intake of the Silas 1064 instrument for measurement.

Ib Hiding

The printing inks before and also after printing through the printhead were applied to No. 2853 test cards from Byk Gardner (contrast paper) at a wet film thickness of 12 μm using a drawdown applicator.

Hiding ability can be compared by comparing the L* values (CIELAB) on a black background against each other. Secondly, the hiding quotient can be formed to determine background-independent metrics for the hiding power of the particular printing ink.

Owing to slight variations in the gray scales of the individual hiding cards, the so-called hiding quotient (Dq) is a suitable metric for demonstrating the hiding power of the particular printing ink. The quotient is calculated from the lightness values on black background to the lightness values on white background.

$$\text{Hiding quotient } Dq = \frac{L^*_{black}}{L^*_{white}}$$

The hiding quotient thus indicates the hiding power of the particular printing ink drawn down on the particular hiding card. It makes it possible for the hiding power of the particular printing inks to be compared against each other.

Ic Luster Measurements

Luster is a measure of directed reflection.

The scattering character specifically of fine effect pigments can be additionally characterized by measuring the luster. Strongly scattering samples therefore should have a low luster.

The wet drawdowns from Ib and also the resulting test prints of the particular examples were measured using a Byk Gardner Micro-Tri-Gloss luster meter at a measuring angle of 60° (for weakly lustrous samples) against a black background. A measurement geometry of 60° is suitable for the so-called "mid range luster" from 10 to 70 luster points, a comparatively high luster resulting in the measurement of a comparatively high numerical value among the luster points.

Example 10

Preparation of Ink-Jet ink 1 and Printing Test with Spectra Nova PH 256/80AAA Printhead Printing ink (drop-on-demand process):
Ink base:
butylglycol acetate: 93.5%
Neocryl B725 (acrylate resin, DSM Nen Resins): 6.5%

The ink base was stirred at room temperature until a clear solution was obtained. The filtration was done through 20 μm metal mesh filter.

The result was a viscosity of about 9 mPa·s at 25° C.
Ink:
4.5 g of pearlescent pigment were slowly added with stirring to 295.5 g of ink base and dispersed for 10 minutes with an Ultra-Turrax laboratory disperser at 7000 rpm.

The final ink was filtered through a 20 μm metal mesh filter.
Printing Test:
The ink-jet ink was initially charged to a stirrer-equipped vessel and pumped from there into the ink supply system of an ink-jet printhead. Printhead temperature was adjusted to 30° C. to achieve the requisite viscosity of 8-20 mPa·s.
Printhead: Spectra Nova PH 256/80AAA (internal filter: 20 μm)
Ink supply system: Spectra Apollo II Print head support kit
Conditions: Head temperature 30° C.
 Droplet frequency 5 kHz
 Operating voltage 100 V
 Wave shape 10/5/5 μs
 Inclination 45°
Test form: 100%; Jet pattern, all nozzles, no gap, 15 minutes continuous operation
The design was such that the ink was not kept in agitation.
Results:
A) Printability

| Pigment | D50 (μm) | D90 (μm) | Cloggage | Hiding loss on substrate to be printed |
|---|---|---|---|---|
| Example 2 | 4.2 | 7.0 | none | none |
| Example 3 | 4.4 | 7.4 | none | none |
| Comparative Example 1 | 11.2 | 18.5 | complete | 99% |
| Comparative Example 2 | 20.0 | 34.7 | complete | 99% |

B) Color and Luster Measurements of Drawdowns:

C) Color and Luster Measurements on Test Prints:

| | 60° luster | |
|---|---|---|
| Pigment | Background | Printed |
| Example 2 | 42.1 | 52.2 |
| Comparative Example 1 | n.p. | n.p. |
| Comparative Example 2 | n.p. | n.p. |

The decisive factor for pearlescent pigments being printable in ink-jet printheads is their particle size. A critical upper limit in the particle size distribution of pearlescent pigments for use in a Spectra Nova PH 256/80AAA ink-jet printhead was determined. The pearlescent pigments to be used according to the invention did not cause any disruptions in the printing test.

As mentioned, pigments that do not meet this criterion are wholly or partly retained by the fine channels or filters in the printhead, or closed the nozzles.

The pigments of Inventive Examples 2 and 3 are finely divided, yet still produced a good luster and pearl effect in ink-jet printing.

Hiding power is even better described using the hiding quotient. It revealed a comparable hiding power in Example 3 and also an increase over the original ink in Example 2.

Luster values after printing were generally higher than for the original printing ink. Luster measurement is a measure of directional reflection. Particularly fine particles of pigment have an increased proportion of edges and hence bring about more diffuse scattering. The greater the number of fine particles in the printing ink, the higher the scattered light fraction and the lower the luster measured. Luster is therefore an indirect measure of the passage of pigment particles through the printhead.

This also explains the increase in luster differences before and after printing with increasing $D_{50}$ and $D_{90}$ values, respectively. The printhead retains some of the coarser pigments. The pigment content decreases and hence also the scattering ability of the respective printing ink, and this results in an increasing luster value.

| | Ink L* | | | | | Printed ink L* | | | | | | Delta |
|---|---|---|---|---|---|---|---|---|---|---|---|---|
| Pigment | $L^*_{black}$ | $L^*_{white}$ | $D_q$ | Luster 60° white | D90 (μm) | $L^*_{black}$ | $L^*_{white}$ | $D_q$ | Luster 60° white | D90 (μm) | Delta $D_q$ | luster 60° white |
| Example 2 | 40.92 | 92.99 | 0.440 | 64.3 | 6.9 | 41.54 | 93.06 | 0.446 | 67.0 | 6.8 | 0.006 | 2.7 |
| Example 3 | 44.64 | 93.03 | 0.480 | 72.3 | 7.5 | 44.88 | 93.45 | 0.480 | 75.8 | 7.5 | 0.000 | 3.5 |
| Comparative Example 1 | n.p. | n.p. | n.p. | n.p. | n.p. | n.p. | n.p. | n.p. | n.p. | n.p. | n.p. | n.p. |
| Comparative Example 2 | n.p. | n.p. | n.p. | n.p. | n.p. | n.p. | n.p. | n.p. | n.p. | n.p. | n.p. | n.p. | n.p. = not possible

Example 11

Preparation of Ink-Jet Ink II and Printing Test with Ink-Jet Printhead Xaar 1001

Printing ink (drop-on-demand process):

Ink base:

| | |
|---|---|
| butylglycol acetate (solvent) | 95.5% |
| Vinylite VYHH (vinyl acetate-vinyl chloride copolymer, DOW): | 4.2% |
| BYK-340 (surfactant) | 0.3% |

The ink base was stirred at room temperature until a clear solution was obtained. The filtration was done through 20 µl metal mesh filter.

The result was a viscosity of about 9 mPa·s at 25° C.

Ink:

25 g of pearlescent pigment were slowly added with stirring to 475 g of ink base and dispersed for 10 minutes with a laboratory ultrasonicator at 150 W power input.

The final ink was filtered through a 20 µm metal mesh filter.

Printing Test:

The ink was filled into the ink supply system of an ink-jet printhead. Printhead temperature was set to 30° C. to achieve the requisite of 6-20 mPa·s.

Printhead: Xaar 1001

Ink supply system: JF Machines PicoColour 140

Conditions: Head temperature 30° C.

Pump setting 40 rpm

Meniscus vacuum 150 mm

Paper feed 2 m/min

Resolution: 300 dpi at 7 dpd

Test form: Whole area

Results:

A) Printability:

| Pigment | $D_{50}$ (µm) | $D_{90}$ (µm) | Nozzle outages | Blockage |
|---|---|---|---|---|
| Example 2 | 4.2 | 7.0 | no | none |
| Example 3 | 4.4 | 7.4 | no | none |
| Example 5 | 5.2 | 8.5 | no | none |
| Example 6 | 6.1 | 10.7 | no | none |
| Comparative Example 1 | 11.2 | 18.5 | yes | yes |
| Comparative Example 2 | 20.0 | 34.7 | yes | yes |

Again, the decisive factor for pearlescent pigments being printable in ink-jet printheads is their particle size. A critical upper limit in the particle size distribution of pearlescent pigments for use in the industrial ink-jet printhead Xaar 1001 was determined. The pearlescent pigments of Examples 2 to 6 did not cause any disruptions in the printing test. As mentioned, pigments that do not meet this criterion are wholly or partly retained by the fine channels or filters in the printhead, or closed the nozzles.

Example 12

Preparation of a Printing Ink III and Printing Test with Ink-Jet Printhead Xaar XJ126/80

Solvent-Based Ink-Jet Ink (Drop-on-Demand Process)

4 g of pearlescent pigment 90.5 g of butylglycol acetate 5 g of Pioloform BN18

0.5 g of Fluorad FC 4430 (from 3M Speciality Materials)

The mixture was stirred for 60 minutes and dispersed with ultrasound for 2 minutes. Filtration through 20 µm metal mesh filter.

Printing Test:

The ink-jet ink was initially charged to a stirrer-equipped vessel and pumped from there into the ink supply system of an ink-jet printhead from Xaar, type XJ126/80. The internal filter of the printhead was removed. The ink system ensured a continuous flow of ink through the printhead.

Printhead: Xaar XJ126/80

Printing conditions: Ink temperature 40° C.

Droplet generation frequency 4.5 kHz

Standard settings of Xaar driver

Test picture: Xaar nozzle test picture

Paper: Canon Microporous Foto Paper

Results:

A) Printability

| Pigment | $D_{50}$ (µm) | $D_{90}$ (µm) | Nozzle outages | Blockage |
|---|---|---|---|---|
| Example 2 | 4.2 | 7.0 | no | none |
| Example 3 | 4.4 | 7.4 | no | none |
| Example 5 | 5.2 | 8.5 | no | none |
| Example 6 | 6.1 | 10.7 | no | none |
| Example 7 | 6.6 | 11.9 | no | none |
| Comparative Example 1 | 11.2 | 18.5 | yes | yes |
| Comparative Example 2 | 20.0 | 34.7 | yes | yes |

When the ink-jet ink was printed up, Inventive Examples 2 to 6 did not and Comparative Examples 1 and 2 did, give rise to nozzle outages within one hour. The prints display a silvery pearlescence effect and good ruboff resistance.

Physical Characterization II of Pearlescent Pigments in Ink-Jet Ink

IIa Determination of Average Thickness of Substrate

Average substrate thickness was determined by various methods. The results are listed in Table 3.

In one case, the pearlescent pigments were incorporated at 10% by weight in Autoclear Plus HS two-part clearcoat varnish from Sikkens GmbH using a sleeve brush and applied to a foil using a spiral-wound bar (26 µm wet-film thickness) and dried. Following 24 h of drying, polished sections were prepared of these drawdowns.

The polished sections were measured in the SEM. At least 100 pigment particles were measured per sample to obtain meaningful statistics. As well as substrate layer thickness (average height $h_S$) the thickness of the metal oxide layer ($d_M$) was determined.

Finally, the average substrate height was calculated according to equation (7). The value used for the substrate radius was half the $d_{50}$ values of the volume-averaged size distribution.

The levels of $TiO_2$ and of substrate material were determined using XRFA.

For this, the pearlescent pigment powder was added directly from the bed into a sample receptacle covered with a 6 μm polypropylene foil (from Fluxana) and measured. The measuring instrument used was an Advant-X from Thermo ARL.

The metal oxide contents according to equation (1) are listed in % by weight based on metal oxide and substrate in column 4 of Table 3.

Finally, the layer thickness of $TiO_2$ had to be determined. This was done by using the colors of the pigments and the customary layer thicknesses published for this in the literature. These oxide layer thicknesses are listed in nm in column 6 of Table 3.

The values calculated according to equation (7) are listed in nm in column 8 of Table 3.

Therefore, in the context of this invention, the average substrate layer thickness is preferably determined according to equation (7) when the thickness of the optically active layer is in the range from 40 nm to 180 nm.

What is claimed is:

1. An ink jet printing ink consisting essentially of pearlescent pigments and at least one of at least one solvent, at least one radiation-curable component and at least one binder, wherein the pearlescent pigments consist of a substantially transparent platelet-shaped substrate having a density $\rho_s$ and one optically active high refractive coating having a density $\rho_M$ and a refractive index $\eta_m > 2.0$, wherein the pearlescent pigments have a $d_{90}$ value for a cumulative frequency distribution of a volume-averaged size distribution function ranging from 3.5 to 15 μm,

TABLE 3

Physical characterization II of examples

| Sample | Substrate | Metal oxide | Metal oxide content (eq. 1) in % by weight | Color | Metal oxide layer thickness in nm from color | Metal oxide layer thickness in nm from SEM | $D_{50}$ [μm] (instrument: Cilas 1064 | $h_s$ [nm] by eq. 7 | $h_s$ from SEM on mica [nm] powder | $h_s$ from SEM on mica [nm] section | $h_s$ from SEM on pearlescence in section [nm] |
|---|---|---|---|---|---|---|---|---|---|---|---|
| Example 2 | Mica as per Ex. 1b | $TiO_2$ | 63.2 | silver | 50 | 52 | 4.2 | 100 | 82 | 94 | 119 |
| Example 3 | Mica as per Ex. 1a | $TiO_2$ | 59.7 | silver | 50 | 51 | 4.4 | 113 | 84 | 97 | 124 |
| Example 5 | Mica (unknown) | $TiO_2$ (Magna Pearl 3100) | 49.3 | silver | 50 | 34 | 5.2 | 119[1] | — | — | 129 |
| Example 6 | Mica | $TiO_2$ | 52 | silver | 50 | 38 | 6.1 | 118[1] | 118 | 133 | 145 |

[1] $h_s$ was calculated according to equation (7) by using the SEM value determined for the layer thickness of the metal oxide Results of Layer Thickness Determinations:

Average substrate layer thickness $h_S$ is less than 150 nm in all inventive examples irrespective of the method of determination. Hence a very fine and thin mica was used in the inventive examples.

In detail, however, certain systematic differences become apparent in the results obtained by different methods. These differences will be briefly discussed below:

Furthermore, good agreements are found for the values calculated by equation (7) via the metal oxide contents and layer thicknesses, with the average layer thicknesses found after the evaluation of the vertically oriented powders of the micas (Table 3, column 10) and of the micas in the knife drawdown.

These findings are supporting evidence for the consistency of the model of equations 1-7 and the reliability of the determination of the average layer thickness by this method.

The determination of the average layer thickness of the micas from the polished sections (Table 3, column 11) systematically show higher values in comparison with the determination on vertically oriented powders. This appears to be attributable to essentially two factors: Mica has a somewhat lower thickness at the edge than in the center. Therefore, the values according to the powder method may potentially be somewhat too low. The pigments of the polished section method have somewhat different orientations of the platelets within the varnish. As mentioned, this leads to seemingly higher values.

The determination of the average layer thickness $h_S$ from the polished sections of the pearlescent pigments themselves leads to potentially even higher values (Table 3, column 12).

and wherein the pearlescent pigments have a $d_{95}$ value for the cumulative frequency distribution of the volume-averaged size distribution function ranging from 5 to 20 μm.

2. The printing ink as claimed in claim 1, wherein the pearlescent pigments have a $d_{90}$ value for the cumulative frequency distribution of the volume-averaged size distribution function in a range from 4 to 13 μm.

3. The printing ink as claimed in claim 1, wherein the substrate of the pearlescent pigments has an average height $h_s$ in a range from 40 to 150 nm.

4. The printing ink as claimed in claim 1, wherein the substrate of the pearlescent pigments has an average height $h_s$ in a range from 50 to 140 nm.

5. The printing ink as claimed in claim 1, wherein the optically active coating of the pearlescent pigments is a metal oxide layer, a metal hydroxide layer, or a metal oxide hydrate layer.

6. The printing ink as claimed in claim 5, wherein the metal oxide layer of the pearlescent pigments comprises at least one metal oxide selected from the group consisting of titanium oxide, iron oxide, cerium oxide, chromium oxide, tin oxide, zirconium oxide, cobalt oxide and mixtures thereof.

7. The printing ink as claimed in claim 1, wherein the transparent platelet-shaped substrate of the pearlescent pigments is selected from the group consisting of natural mica, synthetic mica, glass flakes, $SiO_2$ platelets, $Al_2O_3$ platelets and mixtures thereof.

8. The printing ink as claimed in claim 1,
wherein the printing ink contains from 0.1% to 30% by weight of pearlescent pigment, based on the total weight of the printing ink.

9. The printing ink as claimed in claim 1,
wherein the printing ink is based on at least one of organic solvent and water and the proportion of the at least one of organic solvent and water is in the range from 10% to 95% by weight, based on the total weight of the printing ink.

10. The printing ink as claimed in claim 1,
wherein the printing ink is a radiation-curable ink.

11. The printing ink as claimed in claim 1, wherein the printing ink is a meltable ink.

12. A process for producing the ink jet printing ink as claimed in claim 1,
wherein the process comprises the steps of
(a1) classifying substantially transparent platelet-shaped substrates,
(b1) coating the classified substrate obtained in step (a1) with one optically active high refractive layer to obtain a pearlescent pigment having a $d_{90}$ value for the cumulative frequency distribution of the volume-averaged size distribution function in a range from 3.5 to 15 µm, and a $d_{95}$ value for the cumulative frequency distribution of the volume-averaged size distribution function ranging from 5 to 20 µm,
or
(a2) coating substantially transparent platelet-shaped substrates with one optically active high refractive layer,
(b2) classifying the pearlescent pigment obtained in (a2) to obtain a pearlescent pigment having a $d_{90}$ value for the cumulative frequency distribution of the volume-averaged size distribution function in a range from 3.5 to 15 µm, as well as a $d_{95}$ value for the cumulative frequency distribution of the volume-averaged distribution function ranging from 5 to 20 µm,
and then
(c) mixing the resulting pearlescent pigments with at least one of at least one solvent, at least one radiation-curable component and at least one binder to obtain the ink jet printing ink.

* * * * *